United States Patent [19]

Yu

[11] Patent Number: 4,990,415

[45] Date of Patent: Feb. 5, 1991

[54] THIN FOIL HOLOGRAM

[75] Inventor: Kevin H. Yu, Temple City, Calif.

[73] Assignee: Hughes Aircraft Company, Los Angeles, Calif.

[21] Appl. No.: 226,591

[22] Filed: Aug. 1, 1988

[51] Int. Cl.⁵ .............................................. G03H 1/04
[52] U.S. Cl. ........................................ 430/2; 430/258; 430/325
[58] Field of Search ...................... 430/1, 2, 325, 258, 430/327, 328

[56] References Cited

U.S. PATENT DOCUMENTS

| | | | |
|---|---|---|---|
| 4,509,817 | 4/1985 | Ho et al. | 350/3.61 |
| 4,789,211 | 12/1988 | Wreede | 350/3.61 |
| 4,799,746 | 1/1989 | Wreede | 350/3.6 |
| 4,815,800 | 3/1989 | Chern et al. | 350/3.7 |

Primary Examiner—Jose G. Dees
Attorney, Agent, or Firm—Leonard A. Alkov; Wanda K. Denson-Low

[57] ABSTRACT

A process for manufacturing a hologram on a stable substrate, such as flat glass, and for thereafter transferring that hologram to another substrate, including a curved surface. The process includes the use of an intermediate polyene-based urethane or epoxy acrylate adhesive layer, preferably comprised of Norland Optical Cement. An improved hologram is also disclosed having superior moisture barrier properties.

7 Claims, 1 Drawing Sheet

THIN FOIL HOLOGRAM

BACKGROUND OF THE INVENTION

1. Field of the Invention

The present invention relates generally to processes for manufacturing holographic elements and for transferring the same from an original substrate to another. More specifically, the present invention relates to a process for completely fabricating a holographic element on a highly stable substrate, such as glass, which allows transference of the same to a second substrate without appreciable damage to the holographic element. An improved moisture barrier for the holographic element is also disclosed.

2. Description of Related Art

Holograms are in wide use today. Of particular interest to Applicant is the use of holograms in automotive products, such as head-up displays and plastic visors.

Manufacturing techniques typically include coating a substrate with a light sensitive material (typically a dichromated gelatin), exposing that coated material to a controlled laser interference pattern containing the desired holographic image, processing the exposed coating, baking the processed coating to fine tune the wavelength of reflected light, (i.e. "baking to wavelength") and sealing the processed coating from adverse environmental elements.

Typically, the substrate is a thick, hard and flat material such as glass. After the hologram is recorded and sealed, the glass is cut and/or ground to meet thickness, weight and size requirements.

This typical procedure, however, is relatively expensive and is often accompanied by a high loss rate. In addition, it is difficult to produce thicknesses less than about 0.06 inch. Further, the process is difficult to adapt to curved surfaces.

Another technique is to use a thin film as the substrate. Unfortunately, this suffers from stability problems. Although clamping the thin film between glass plates to overcome this stability problem has been tried, the clamping often causes stress, resulting in optical imperfections. In addition, the film sometimes warps during the baking to wavelength step. In order to provide needed stability, moreover, the film often has to be so thick that it does not adapt well to double-curved surfaces such as the automobile window.

Another technique is to coat a traditional glass substrate with a poor mold release before applying the gelatin on which the holographic image is recorded. Thereafter, the gelatin is peeled from the glass substrate and deposited upon the final substrate.

One problem with use of a poor mold release, however, is that it does not hold up well. As a result, the gelatin must generally be transferred to a sheet of polystyrene before the wet processing step. Because the polystyrene absorbs water, however, a partial loss in hologram efficiency often results. During the baking to wavelength step, moreover, the gelatin is often subject to shrinkage, delamination and/or tearing because of difficulties in adhering the gelatin to the polystyrene layer.

Another technique is to start out by affixing the gelatin to the final substrate material, typically a piece of curved or bulky glass, acrylic or other transparent material. Because of the generally large size and/or unsuitability to the recording process, however, these are often difficult to coat, expose and/or process.

There therefore has been a continuing need for a method of producing holograms which has the stability of holograms recorded on glass substrates, but the flexibility of holograms produced on thin film-based substrates. There has also been a continuing need for holograms having superior moisture barrier properties so as to maximize use efficiency.

SUMMARY OF THE INVENTION

One object of the present invention is to overcome these and other problems in the prior art.

Another object of the present invention is to provide a process for manufacturing holographic elements on a highly stable substrate, such as glass, and for thereafter transferring the same to a different substrate, one on which original creation would have been difficult or impractical.

It is a further object of the present invention to provide an improved moisture barrier for holographic elements.

It is a further object of the present invention to provide a process for firmly adhering a hologram-recording material to a highly stable substrate throughout the hologram fabrication process which, thereafter, can easily be removed for attachment to an end use substrate.

It is a still further object of the present invention to provide a process which results in the creation of a holographic element which, although detachable from the original substrate, is well-supported during transference to the end use substrate.

It is a still further object of the present invention to provide a process which produces a highly thin and flexible holographic element at all times while the element is affixed to a highly stable substrate such as glass.

It is a still further object of the present invention to provide a process which produces a holographic element which can be easily transferred for use in a variety of automotive applications, including head-up displays and plastic visor display for military applications.

These and other objects of the present invention are achieved by coating the generally-used photo sensitive dichromated gelatin, not directly on a glass substrate, but on a thin adhesive layer of a polyene-based urethane or an epoxy acrylate, which has first been coated on the glass. This structure is then exposed, processed and baked to wavelength. Thereafter, a second adhesive layer of a polyene-based urethane or an epoxy acrylate is coated on top of the gelatin, and the three layers, comprising the first polyene-based urethane or epoxy acrylate layer, the gelatin, and the second polyene-based urethane or epoxy acrylate layer, are peeled off of the glass. Through the use of an adhesive, the peeled-off holographic element is then attached to the final and desired substrate surface.

Because of the adhesive or bonding strength of the polyene-based urethane or epoxy acrylate layer, the gelatin remains firmly affixed to the glass substrate during all phases of processing, thereby achieving a level of stability commensurate with gelatins which have been directly coated on the glass. Once processing is completed, the gelatin can be removed from the thick glass and affixed to the final substrate. Because of the flexibility of the removed material, the final substrate may be doubly curved and may have other desired properties without regard or concern for the difficulties which might have otherwise been encountered if the final substrate was used as the original substrate during the holographic recording and processing steps.

The above discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 1 illustrates the casting of a thin layer of polyene-based urethane or epoxy acrylate adhesive material on a glass substrate.

FIG. 2 illustrates the casting of a thin gelatin layer on top of the thin polyene-based urethane or epoxy acrylate adhesive layer.

FIG. 3 illustrates the casting of a second thin polyene-based urethane or epoxy acrylate adhesive layer on top of the thin gelatin layer.

FIG. 4 illustrates the gelatin layer, sandwiched between two thin polyene-based urethane or epoxy acrylate adhesive layers, being peeled off of the glass substrate.

DESCRIPTION OF THE PREFERRED EMBODIMENTS

The present invention is directed to processes for manufacturing holograms and holographic images on a hard and stable substrate and for thereafter transferring the same to a different substrate. A hologram having improved moisture barrier properties is also contemplated.

Figure 1:
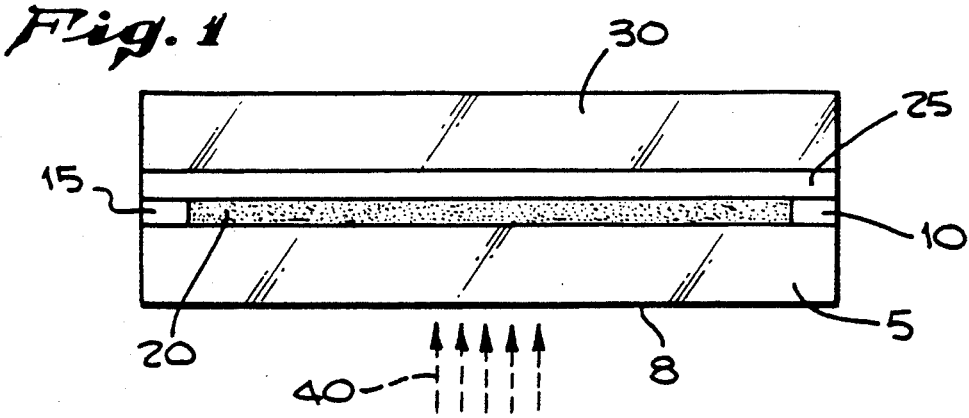
FIGS. 1 through 4 illustrate a preferred embodiment of the manufacturing process in accordance with the present invention.

FIG. 1 illustrates the first process step of the preferred embodiment of the present invention.

As shown in FIG. 1, a thin polyene-based urethane or epoxy acrylate adhesive layer 20 is cast onto glass substrate 5.

This is done by first placing spacers around the perimeter of the area on which the hologram is to be recorded. Although only two spacers 10 and 15 are shown in FIG. 1, it is understood that, in practice, several more spacers may be used.

These spacers should be of a thickness equivalent to the desired thickness of polyene-based urethane or epoxy acrylate adhesive layer 20. Thicknesses in the range of 0.005 to 0.02 inches are preferred.

In the preferred embodiment, applicant utilizes Norland Optical Cement for adhesive 20, the newest version of which uses a polyene-based urethane. This material is available from Norland Products, P.O. Box 145, New Brunswick, N.J. 00902. Type 65 (order no. NOA-65) has been found to yield the best result when the holographic element is ultimately to be affixed to a curved surface. Type 61 (order no. NOA-61) or type 65 has been found to work best when the holographic element is ultimately to be affixed to a flat surface. Other polyene-based urethane aligomers or epoxy acrylate aligomers may be used so long as they provide the desired adhesive properties.

After placement of spacers 10 and 15 (and such additional spacers as are deemed desirable), the polyene-based urethane or epoxy acrylate is poured on the surface of glass substrate 5, causing formation of polyene-based urethane or epoxy acrylate adhesive layer 20.

Covering material 25, preferably 1/16 polystyrene or polyester, is then placed over polyene-based urethane or epoxy acrylate adhesive layer 20 and second glass substrate 30 is placed on top, all as shown in FIG. 1.

Thereafter, the adhesive polyene-based urethane or epoxy acrylate is cured by shining ultraviolet light source 40 through exposed underside 8 of glass substrate 5, as shown in FIG. 1. Applicant has found that a twenty-minute exposure from a mercury arc lamp emitting 7,000 uw/cm$^2$ is best.

After curing the polyene-based urethane or epoxy acrylate, glass substrate 30 is removed and covering material 25 is peeled off.

The exposed surface of polyene-based urethane or epoxy acrylate adhesive layer 20 is then washed with iso-propanol.

Figure 2:
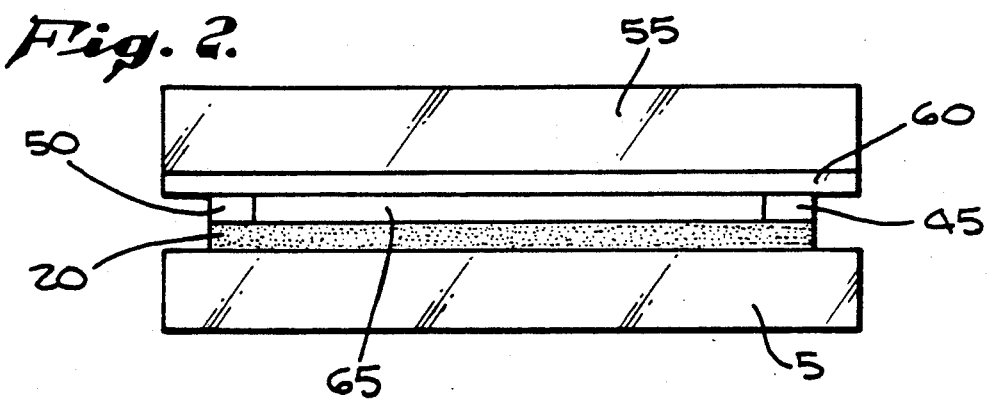

As shown in FIG. 2, new spacers 45 and 50 (and such further spacers as are deemed desirable) are placed on top and around the outer perimeter of polyene-based urethane or epoxy acrylate adhesive layer 20. These spacers should have a height equivalent to the desired thickness of the to-be-deposited light sensitive gelatin material (which is typically between 0.005 and 0.020 inches).

Light sensitive material 65, such as dichromated gelatin solution, is then poured on top of the surface of polyene-based urethane or epoxy acrylate adhesive layer 20. It is then cast by placing glass cover 55 over it and thereafter applying standard chilling techniques. In order to thereafter allow for easy removal of glass cover 55, the surface of glass cover 55 which comes in contact with light sensitive material 65 should be treated with a silane mold release. This silane mold release is illustrated as separate layer 60 in FIG. 2.

After chilling, cover 55 (together with its silane mold release layer 60) is removed and light sensitive material 65 is dried by accepted standard procedures. Light sensitive material 65 is then exposed, processed and baked to wavelength in accordance with procedures and techniques well-known in the art. No special precautions are necessary.

It is noted that, following exposure, but prior to wet processing, light sensitive material 65, polyene-based urethane or epoxy acrylate adhesive layer 20, and glass substrate 5 may be pre-soaked in a one molar solution of potassium iodide (or sodium iodide) in water. If this is done, dichromate stain in polyene-based urethane or epoxy acrylate adhesive layer 20 and photo sensitive material 65 will be reduced.

Figure 3:
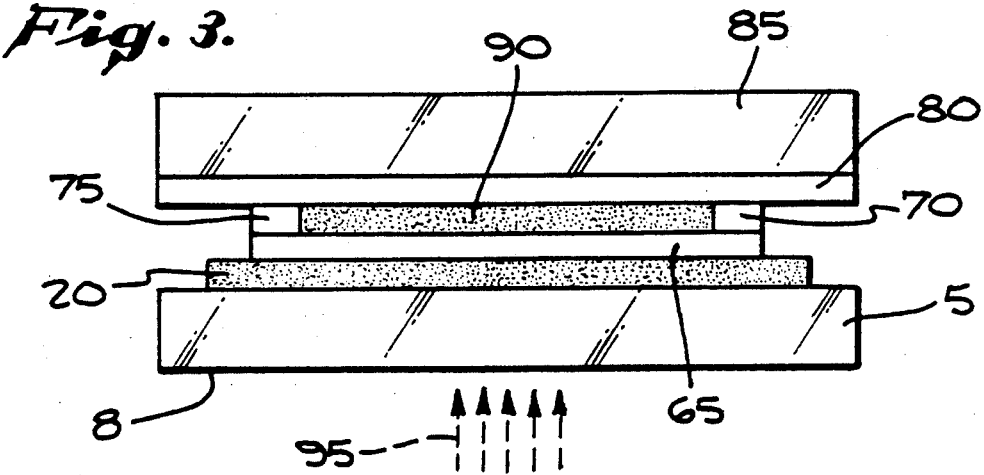

After processing and some baking to wavelength, second polyene-based urethane or epoxy acrylate adhesive layer 90 is added as shown in FIG. 3.

The procedure is the same as was the procedure for first layer 20 as described above. Spacers 70 and 75 (and such additional spacers as are desirable) are placed around the perimeter and on top of photo sensitive material 65, polyene-based urethane or epoxy acrylate (preferably of the same type as was used in first layer 20) is poured between the spacers, covering material 80 (preferably 1/16 inch polystyrene or polyester) is placed over polyene-based urethane or epoxy acrylate adhesive layer 90, glass cover 85 is placed on top, and the entire structure is again subjected to ultraviolet curing.

The width of spacers 70 and 75 (and such additional spacers as are desirable) should be sufficient such that the combined resulting width of photo sensitive material 65 and its two surrounding polyene-based urethane or epoxy acrylate adhesive layers 20 and 90 will be equivalent to the desired application width. In the preferred embodiment, spacers 70 and 75 are between 0.005 and 0.020 inch.

With respect to the curing, this should preferably be for approximately five to ten minutes by directing UV 95 rays of a mercury arc lamp having an intensity of approximately 7,000 uw/cm² toward underneath side 8 of glass substrate 5. (Covering material 80, if polystyrene or polyester, is opaque to the UV rays). After curing polyene-based urethane or epoxy acrylate adhesive surface 90, glass cover 85 is removed and cover 80 is peeled off.

Thereafter, the hologram is relatively stable and can be stored, baked further, or used immediately.

Figure 4:
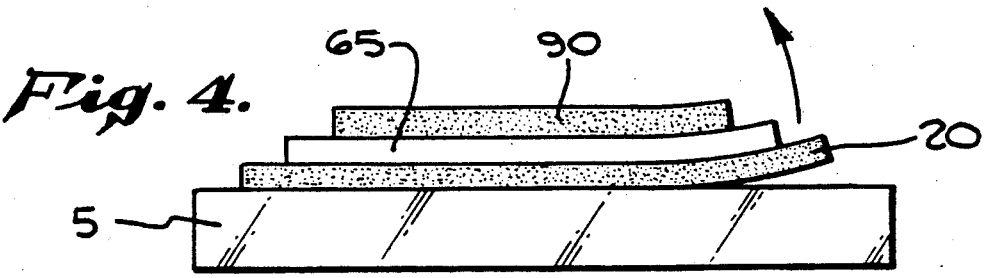

In order to use, the hologram and glass substrate (i.e., the entire structure shown in FIG. 4) should be heated to approximately 80° C., following which layers 20 and 90 and material 65 are simultaneously peeled from the surface of glass substrate 5, all as shown in FIG. 4.

The resulting hologram has superior moisture barrier characteristics. It can be applied to the desired final substrate with a thin layer (typically 0.001 inches) of polyene-based urethane or epoxy acrylate adhesive, again preferably of the type already used in surfaces 20 and 90. Following such final application, ultraviolet curing is again preferred for approximately thirty minutes from a mercury arc lamp operating at an intensity of 7,000 uw/cm² and being directed to either surface of the holographic element. If desired, a cover may be placed over the entire surface.

Having thus described an exemplary embodiment of the present invention, it should be noted by those skilled in the art that the within disclosure is exemplary only and is not an exhaustive listing of all of the materials and process parameters and that various other alternatives, adoptions and modifications may be made within the scope of the present invention. Accordingly, the present invention is not limited to the specific embodiments illustrated herein, but is only limited by the following claims.

What is claimed is:

1. A process for producing a thin foil hologram comprising the steps of:
   a. First applying a thin layer of an polyene-based urethane or epoxy acrylate to the surface of a substrate;
   b. Second, applying a thin layer of a photo sensitive material on top of said thin layer of polyene-based urethane or epoxy acrylate; and
   c. Third, processing said photo sensitive material so as to record thereon a holographic image wherein said processing includes the steps of exposing said photo sensitive material and thereafter wet processing of said material, and wherein said substrate, polyene-based urethane or epoxy acrylate, and photo sensitive material are pre-soaked in a solution of potassium iodide or sodium iodide between said exposure and said wet processing steps.

2. The process of claim 1 wherein said step of applying said polyene-based urethane or epoxy acrylate includes irradiating said polyene-based urethane or epoxy acrylate with ultraviolet light.

3. The process of claim 1 wherein said polyene-based urethane or epoxy acrylate is washed with isopropanol following its application on said substrate.

4. The process of claim 1 including the additional step, following said photo sensitive material processing step, of applying a second layer of polyene-based urethane or epoxy acrylate on top of said layer of photo sensitive material.

5. The process of claim 4 wherein said application of said second layer of polyene-based urethane or epoxy acrylate includes irradiating said second layer of polyene-based urethane or epoxy acrylate with ultraviolet light.

6. The process of claim 1 including the further step of peeling said layer of polyene-based urethane or epoxy acrylate and layer of photo sensitive material from said substrate surface and thereafter affixing the same to a different substrate through the application of another layer of polyene-based urethane or epoxy acrylate.

7. The process of claim 6 wherein said photo sensitive material and said layers of polyene-based urethane or epoxy acrylate are thereafter cured by ultraviolet radiation.

* * * * *